United States Patent [19]

Maxemchuk et al.

[11] 3,879,710

[45] Apr. 22, 1975

[54] DATA PROCESSOR FOR A LOOP DATA COMMUNICATIONS SYSTEM

[75] Inventors: Nicholad Frank Maxemchuk, Trenton; Hugh Edward White, Pennington, both of N.J.

[73] Assignee: RCA Corporation, New York, N.Y.

[22] Filed: Mar. 1, 1974

[21] Appl. No.: 447,220

[52] U.S. Cl. .......................... 340/172.5; 179/15 AL

[51] Int. Cl. .............................................. H04j 3/12

[58] Field of Search.. 340/172.5; 179/15 AL, 15 BA

[56] References Cited

UNITED STATES PATENTS

| | | | |
|---|---|---|---|
| 3,680,056 | 7/1972 | Kropfl | 340/172.5 |
| 3,732,543 | 5/1973 | Rocher et al. | 340/172.5 |
| 3,755,789 | 8/1973 | Collins | 179/15 AL |
| 3,781,478 | 12/1973 | Blahut et al. | 179/15 AL |
| 3,787,627 | 1/1964 | Abramson et al. | 179/15 AL |
| 3,810,100 | 5/1974 | Hungerford et al. | 179/15 AL |

*Primary Examiner*—Harvey E. Springborn
*Assistant Examiner*—Michael C. Sachs
*Attorney, Agent, or Firm*—Edward J. Norton; Joseph S. Tripoli

[57] ABSTRACT

A data processor for a time division multiplexed communications system. A plurality of such data processors are connected in series in a loop configuration, each having a data terminal associated therewith, for establishing a connection between data processors in a time division multiplexed channel. Each data processor demodulates the signal on the loop, extracts timing information from the loop signal and locates the channel to be used for establishing the connection between itself and another data processor. Each data processor in addition, regenerates and passes on data not intended for that data processor. Data found in the correct or selected channel is provided to the data terminal which may be a synchronous or an asynchronous device. Data from the terminal is inserted into the selected channel, modulated in accordance with a particular rule and transmitted onto the loop to another data processor operating in the selected channel.

6 Claims, 13 Drawing Figures

DATA PROCESSOR FOR A LOOP DATA COMMUNICATIONS SYSTEM

The present invention relates generally to data communications systems and more specifically to loop data communications systems.

A loop system, in its simplest form, is a serial connection of nodal points. A terminal or series of devices capable of transmitting and/or receiving digital information is located at each of the nodal points. The nodal points are wired in series one with another.

Such loop systems are especially desirable for small area data communications. That is, for example, in an industrial plant, hospital or university environment it may be advantageous to implement such a loop system so that several users may access a computer and/or transmit and receive digital data from one user to another, and/or share long distance circuits or outside lines to communicate with remote locations.

Some of the goals of a local area data communications system should be ease in implementation, ease in user operation and, in addition, low cost implementation and operation. Another goal of such a system is the ability to handle a variety of data terminals at a variety of data rates. Such a system also should handle both synchronous and asynchronous data terminals.

The loop data communications system described in detail herein utilizes, although is not limited to, telephone grade twisted pair conductors coupling the nodal points one to another for low cost operation. A time division multiplexing (TDM) technique is utilized to efficiently subdivide and switch the loop transmission capacity among the various terminals on the loop. The switching functions are distributed around the loop as opposed to a central switching device, such as a computer. Central computer switching and control is a known prior art technique.

In the present loop system a terminal clock signal is derived from the signal received from the loop at a nodal point. This clock signal is used to generate the timing for the signal transmitted back onto the loop from the nodal point. The derived clock precisely identifies the time slot assigned to the particular terminal and there is then no need for a guard space or a buffer zone between transmissions from different terminals. Thus a synchronous mode of operation is achieved although the transmitting and receiving terminals are distributed around the loop. Another feature of the present loop system is that it is a fully duplex communications network since received data may be replaced by transmitted data at any nodal point on the loop.

The loop configuration of the present system utilizes a digital data processing unit at each nodal point. That is, the data processing units are the devices which are serially connected via the twisted pair one to another. The data processing unit converts the signals transmitted over the loop from a ternary form into two binary signals. A clock signal is derived from the loop data signal.

In addition, each data processing unit examines the bits on the loop which indicate a system class address or word address. Once the appropriate address has been identified, the data processing unit counts out time division slots to a selected channel. The data processing unit then examines the bits in the time slots comprising the selected channel to determine if that channel is either available or busy. If the selected channel is available the data terminal is brought into a ready condition via an interface connector which couples the data processing unit to the data terminal. The data processing unit applies a signal to the interface connector based on a clock signal derived from the loop and the interface connector supplies this clock signal to synchronous data terminals. Data from the synchronous terminal is sampled on one edge of this clock signal and data going to the synchronous data terminal is clocked on the other edge thereof. This clock signal is not supplied to asynchronous data terminals, but, is used instead to sample the data to and from such a terminal. The data processing unit takes data from the data terminal via the interface connector, modulates that data to conform to the loop transmission rule and then supplies the modulated data onto the loop in the appropriate channel.

The other element serially connected in the present loop system is the loop controller. The loop controller provides several functions among which is the provision of a loop clock signal and a buffer unit which produces a loop delay which is a multiple of the total number of bits in the TDM frame. The delay function is required because each operating data processing unit is transmitting and receiving data in a TDM channel. After the time slot passes a given data processing unit, it circulates around the loop and returns to that unit. The total delay around the loop must be a multiple of the total bits in a frame to maintain synchronous operation so that the data processing unit periodically finds its control and data signals. That is, a given data terminal must utilized the same time slots in each frame. Since the delay around the loop may vary with time and changing conditions, the delay provided by the loop controller must therefore be adaptive.

The loop controller receives the signal from the loop, demodulates it and extracts received signal timing information therefrom. The received data and timing information is then provided to an error detector which determines if there are violations of the transmission or modulation rule. The received data is provided with transmit timing and delay if necessary.

In addition, the loop controller provides the transmit synchronizing signals and appropriate addressing for partitioning the total frame length into subframes. Finally, the data which is to be put out on the loop is modulated according to the transmission rule, inserted into the appropriate time slot in the particular channel being used and then transmitted out of the loop controller onto the loop itself.

The digital loop data communications system, the data processing unit and the loop controller are each described in detail herein. In the Drawing FIG. 1 is a block diagram of one embodiment of the present loop data communications system;

Figure 1:
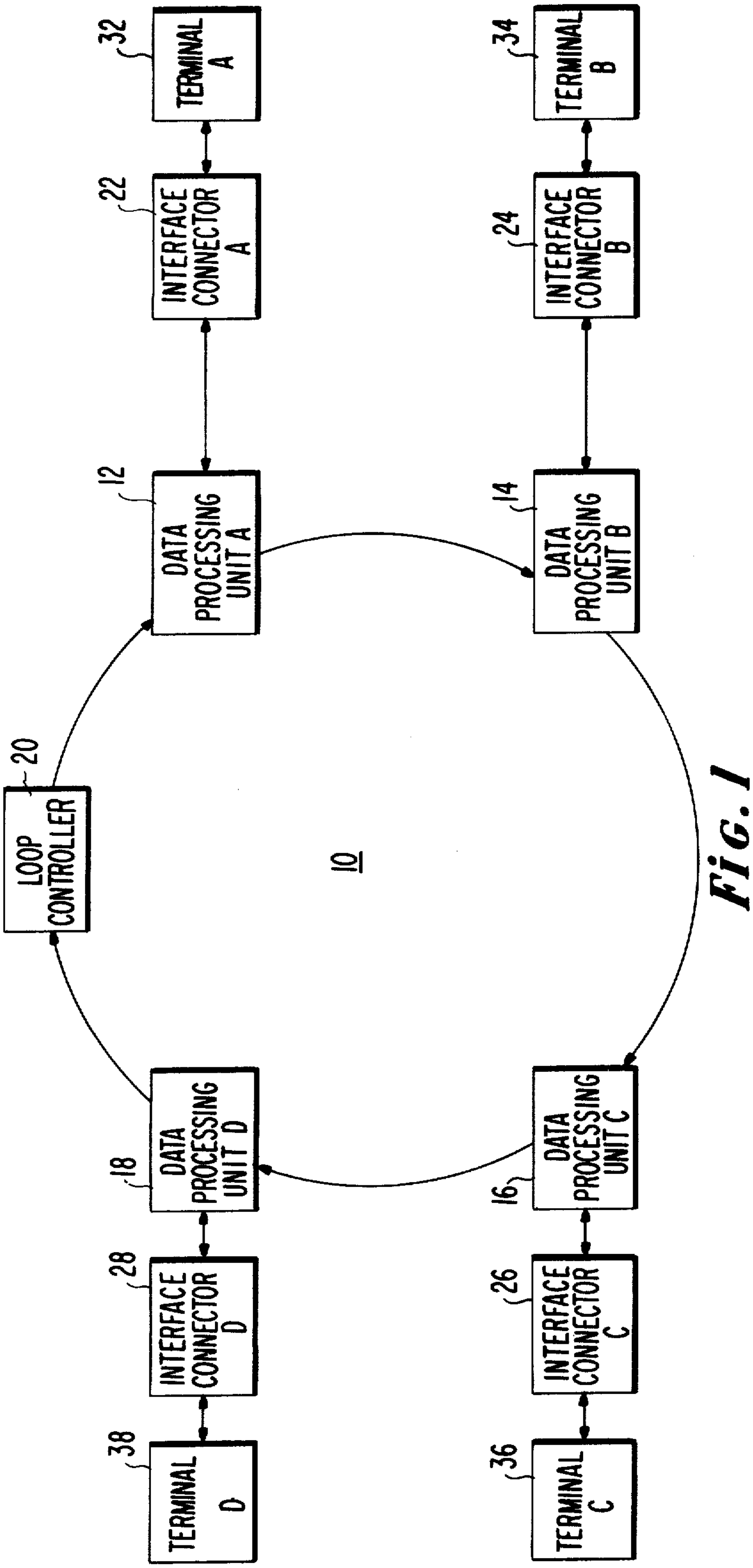

Referring now to FIG. 1, a simplified digital data loop communication system 10 is shown. Loop 10 comprises a plurality of data processing sets 12, 14, 16 and 18 connected in a loop configuration. These data processing sets will insert and extract digital data to and from the loop 10 on a time division multiplex basis. In the embodiment of FIG. 1, signals are transmitted only in the direction of the arrows and the physical connections between data processing units is accomplished over twisted pairs of conductors.

Also included in the loop 10 is a loop controller 20, connected via twisted pairs between data processing units 18 and 12. Controller 20 provides a multitude of services to the loop 10 including a loop clock and a buffer to produce a loop delay that is a multiple of the period of a frame. These functions will be explained and described more fully herein.

Each of the data processing units 12, 14, 16 and 18 also has connected respectively thereto interface connectors 22, 24, 26 and 28. The interface connectors 22, 24, 26 and 28 are designed to conform to a standard electrical specification termed RS-232 which is a specification commonly used for joining two business machines. Each of the interface connectors 22, 24, 26 and 28 has a data terminal 32, 34, 36 and 38 connected respectively thereto. Units 32, 34, 36 and 38 may be computers, teletype machines, video terminals or any other source or sink of digital information.

The signals transmitted around the loop 10, i.e., between units 12, 14, 16, 18 and 20, are three level signals and have a bit rate of 1.536 MHz. The signals contain a plus, minus or zero voltage during one half of a bit time interval and zero voltage during the other half. In a loop configuration such as 10, especially where twisted pairs are used to connect units 12, 14, 16, 18 and 20 the signals should have frequent transitions and a zero average D.C. content for reliable retransmission of signals around the loop. The transmission rule used in the loop system 10 is simple to implement and provides a unique signal for work synchronization.

The transmission rule used in loop system 10 utilizes two pulses to transmit each logicl bit. A logical one is transmitted as +V, 0, −V, 0 whereas a logical zero is transmitted as −V, 0, +V, 0. Synchronization signals are transmitted as 0,0,0,0 in terms of voltage. The transmission rule contains 100 percent redundancy and makes error detection easy to implement.

Figure 2:
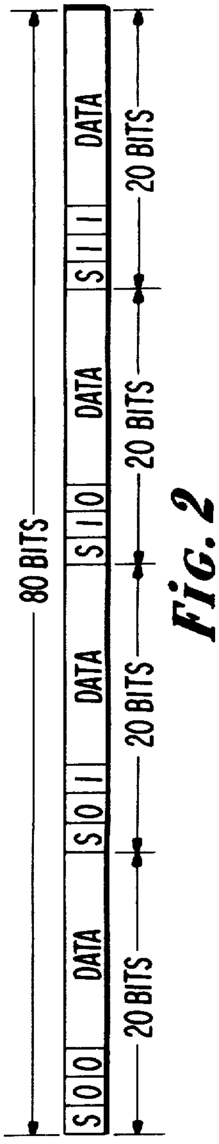
FIG. 2 is a diagram of one frame of the TDM information used in the system of FIG. 1.

The total transmission capacity of the loop 10 is divided into four time division multiplexed (TDM) system classes or works by the loop controller 20. FIG. 2 shows one TDM frame as composed by the loop controller 20. One frame includes a total of 80 bits which are divided into four words or system classes of twenty bits each. Each word occurs at a rate of 9,600 times per second. The first bit of each word is a synchronization bit, the next two bits in each word are a system class address and the last seventeen bits are used for data. The data bits for each word are divided into eight channels, each channel occupying two bits. The seventeenth bit is unused in the loop system 10, but, is available for parity checking each word or to broadcast system status to all nodal points.

One of the two bits in each channel is used to transmit connectivity information. The other bit in each channel is used to transmit data between terminals such as 32, 34, 36 and 38. While FIG. 2 shows eight channels per word other embodiments of the system could make this number variable and may be selected by using jumpers in the loop controller, for example.

The subdivision of the total loop capacity into four system classes allows the simultaneous use of the loop by up to four independent networks. While the data terminals such as 32, 34, 36 and 38 are using the same loop system 10 and the same loop controller 20, these terminals may be independent of one another from a system standpoint. This allows different modes of operation to support different terminal types.

The signalling rate of 1.536 Megapulses/sec is desirable because it is readily obtained over telephone grade twisted pair lines for distances up to a mile and it is also a multiple of standard synchronous rates of 2,400, 4,800, and 9,600 baud.

Thus, the loop system 10 of FIG. 1 allows for the simultaneous use of the loop by many different terminals at many different data rates, the only restriction being that both the transmitting and receiving units must be at the same data rate. As shown in FIG. 2, each of the four classes comprise eight channels, thus there are 32 available channels for communication between terminals. Some of these channels may be operating at synchronous data rates of 2,400 bits per second while others are operating at 4,800 bits per second, and still others may be operating at 9,600 bits per second.

In addition to the synchronous data rate operation, asynchronous terminals may also be handled by the loop system 10. In this case the asynchronous data is sampled at one of the synchronous data rates so that asynchronous data is made to look like a synchronous data rate. In the case of loop system 10, the highest asynchronous data rate handled is approximately ¼ of the highest synchronous rate of 9,600 bits per second. Thus, asynchronous data, up to 2,400 bits per second, is sampled to provide multiple samples of each data bit transmitted so that the rate around the loop appears to be 9,600 bits per second.

In loop system 10 there are two means for establishing a connection between any two terminals such as 32, 34, 36 and 38. The first mode of connection dedicates a TDM channel for communication between two terminals on the loop, say 32 and 36. In this mode either terminal 32 or 36 can originate the connection or break the connection. A dedicated channel of this type is made unaccessable for other terminals by disabling the dedicated channels within the data processing units not servicing terminals 32 and 36.

The second mode of interconnection allows many terminals to share a group of TDM channels providing that some terminals are originate only terminals while others are answer only terminals. One and only one answering terminal must remain on each TDM channel to answer calls on that channel. An originating terminal such as 34 may therefore select the destination of a call by merely selecting the appropriate channel. If another originating terminal is utilizing this channel to communicate with the answering terminal, then terminal 34 will get a busy indication on the channel selected. This busy indication appears on the data processing unit 14 and prevents terminal 34 from interrupting or listening to a previously established connection over this particular channel.

Several of these types of channels may be established to particular answering terminals. For example, terminal 38 may be a computer and several channels may be set up for communicating with terminal 38. If terminal 34 seeks a channel to connect with terminal 38 and that one is busy, then the operator at terminal 34 selects another channel on data processing unit 14 which also goes to the computer terminal 38 via the data processing unit 18.

A data processing unit such as 18 which is coupled to a terminal assigned to answer calls on a given channel inserts logical zeros in both the data and control slots when the channel is not being used. A data processing unit, such as 14, which is connected to an originating terminal such as 34 inserts a logical one in the first bit of the particular channel as long as it wishes to maintain the connection, and the data is inserted in the second bit slot of the channel. In response to the call initiation, the unit receiving the call, such as unit 18, inserts a logical one in the second bit slot to maintain its connection and its data bit in the first bit slot of the channel being used.

During the periods when a data processing unit is not transmitting data, it transmits a marking line which is transmitted as a zero in the data bit. A given data processing unit will transmit connectivity information in one bit slot in a given channel and examines the other bit slot in which it transmits data, to determine if the other data processing unit to which it was connected is still connected. If one unit drops off the loop 10, the data transmitted to it by another unit is wrapped around the loop and interpreted by the sending unit as if it were connectivity information from the terminal that has left the loop 10. Eventually, zeros will return to the sending unit and the sending unit will realize that the connection has been broken. This connectivity philosophy insures that a given data processing unit will not remain on the loop 10 transmitting data after the connection on a particular channel has been broken.

A given data processing unit trying to establish a connection on a particular channel examines both bit slots in the channel. If the channel is busy because another unit is using the channel, at least one of the bits examined will be a logical one and the data processing unit seeking to establish a connection on this channel will be inhibited from so doing. To prevent connections from being made or broken by noise on the loop system 10, two adjacent bits in the connect slot must be identical before the connectivity state of a given unit is changed.

Figure 3:
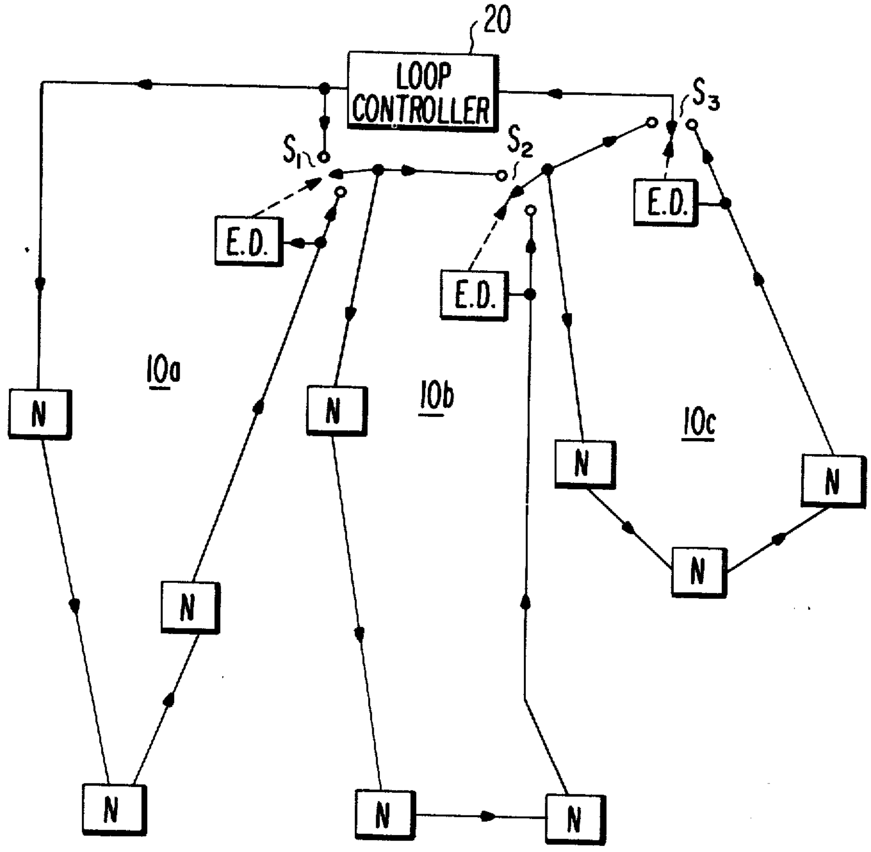
FIG. 3 is a block diagram of a multiple loop system.

There are many variations in the arrangement of the elements constituting the loop system 10 shown in FIG. 1 which may be desirable. One such variation in loop topology is shown in FIG. 3 where multiple loops are utilized for increasing the reliability of the system. In the previously described loop system 10, if a single node or a branch between nodes fails, then the entire system 10 is disabled. A node is defined as a location where a data processing unit is placed in the system along with its interface connector and data terminal.

In FIG. 3 the boxes labeled N are system nodes, and the boxes labeled E.D. are error detectors. The error detectors are devices which detect errors in the transmission rule, i.e., where a logical one is transmitted as +V, 0, −V, 0 and a logical zero is transmitted as −V, 0, +V, 0. The principal element in the error detector is a 16 stage up-down counter. The error detector examines the bits in a particular subloop over discrete time intervals. The counter is incremented if errors are detected in a given interval and decremented if no errors are detected in the time interval. The probability of any errors in an interval can be set, for a particular bit error probability, by adjusting the number of bits in the interval. In this way, the bit error rate at which the subloop is disabled may be selected.

It will be seen that the loop configuration in FIG. 3 is partitioned into several subloops, 10*a*, 10*b*, and 10*c*. Each of the subloops 10*a*, 10*b*, and 10*c* are serviced by a single loop controller 20 and each has an error detector E.D. associated therewith. In addition, each of the subloops 10*a*, 10*b*, and 10*c* has a switch S1, S2, and S3 respectively associated therewith.

If the error rate determined by the error detector for subloop 10*a* does not reach its prescribed count in the up-down counter, then the loop segment 10*a* is assumed to be functioning properly and the switch S1 is positioned to pass data through it to subloop 10*b*. If the error rate determined by the error detector for subloop 10*a* reaches its prescribed count in the up-down counter, then the loop segment 10*a* is considered faulty and the switch S1 is set to bypass loop 10*a*. The actual error detection hardware and associated switches could, if desired, be located within the loop controller 20 so as to centralize the structure.

At this point it is clear that the important structural elements for implementing the loop configurations shown in FIGS. 1 and 3 are the loop controller and the data processing units. The implementation of these units is discussed in detail relative to FIGS. 4–12.

Figure 4:
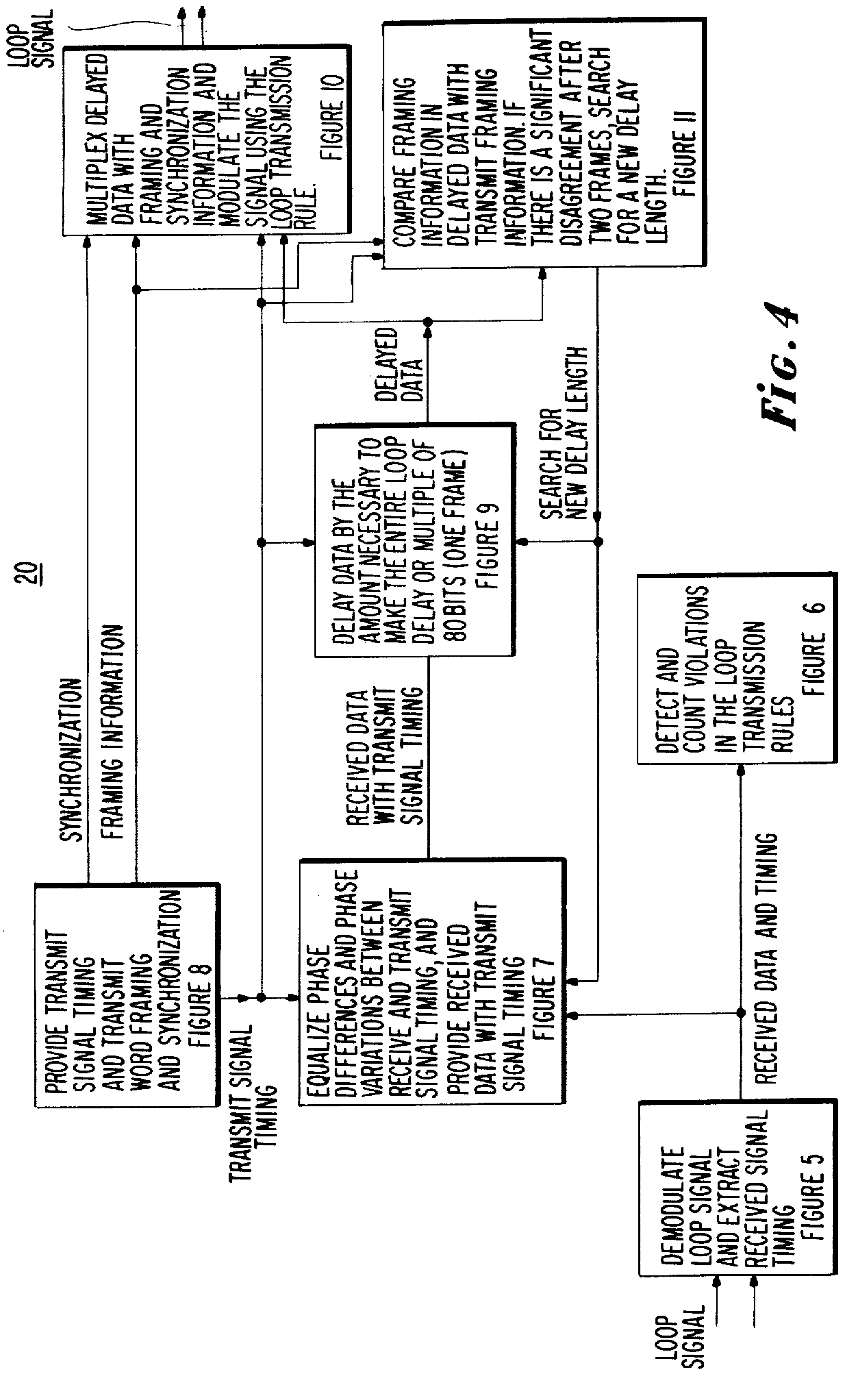
FIG. 4 is a block diagram showing the organization of the loop controller used in the loop system of FIG. 1.

FIG. 4 represents the organization of FIGS. 5-11 which in their totality represent the structure of the loop controller 20 used in the loop system 10 of FIG. 1.

As described, the system of the present invention is a time division multiplexed, loop configured, fixed slot system. The system has frames of 80 bits, each bit occupying one time slot. Each channel comprises two time slots. Each terminal is assigned one or more channels in the frame. When a slot leaves a terminal, it circulates around the loop and returns. To provide terminals with slots at the frame rate the end of one frame and the beginning of the next must be juxtaposed, therefore, the total delay around the loop must be a multiple of 80 bits. The delay around the loop is a function of the number of devices in the loop, the length of the wire and the temperature of the wire. It may change during the course of the day. Therefore, a device must be inserted into the loop to adaptively modify the delay. This is one of the functions of loop controller 20 shown in Figure 4. In addition to this function, the loop controller 20 supplies timing to synchronize the various terminals and detects errors in the modulation rule.

The loop controller 20 in FIG. 4 is functionally divided into seven parts. The loop signal is brought into the block representing FIG. 5. It is demodulated and timing is extracted from the received signal. The received data and timing are brought to the blocks representing FIGS. 6 and 7. In the block representing FIG. 6, violations to the modulation rule are detected and counted. In the block representing FIG. 7, the received data is retimed, using the transmit data timing, and slight variations in the input signal timing are assimilated. The timing for the transmit signal is provided in the block representing FIG. 8. After the data is retimed in the block representing FIG. 7, it is passed to the block representing FIG. 9 where the necessary delay is inserted. The delayed data is passed from the block representing FIG. 9 to the blocks representing FIGS. 10 and 11. In the block of FIG. 10 the data is modulated and transmitted on the loop. The synchronization bit and the system class address bits are passed from the block of FIG. 8 to the block of FIG. 10 and are always transmitted in the proper position in the frame. The delayed data is also passed to the block of FIG. 11. In this block the bits in the system address position are compared with the true system address bits. If a significant disagreement occurs the loop delay line is assumed to have the wrong length and a new length is sought out.

Figure 5:
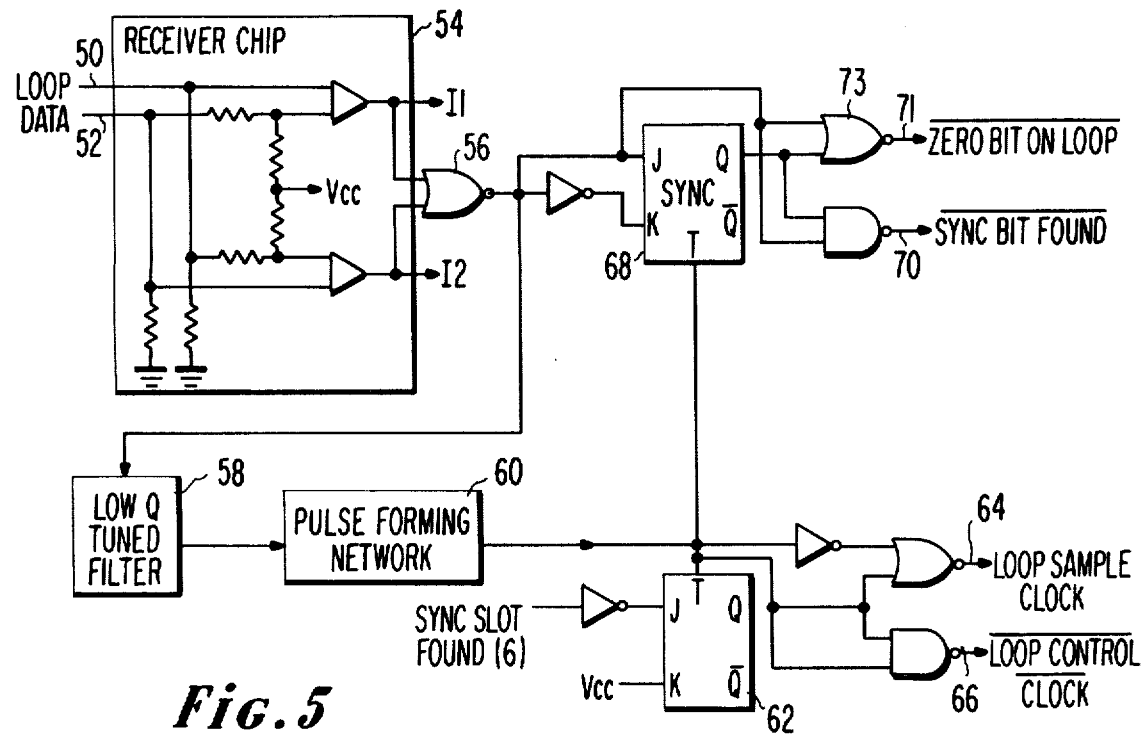
FIGS. 5-11 are diagrams showing the details of the blocks used in FIG. 4.

Referring now to FIG. 5, the signal from the loop is provided on twisted pair conductors 50 and 52. It will be recalled that the signal on the loop is a ternary signal. A one is transmitted as +V, 0, −V, 0, a zero is transmitted as −V, 0, +V, 0 and the sync signal is transmitted as 0, 0, 0, 0 volts. A receiver chip 54, connected to lines 50 and 52, translates the ternary signal on the loop into two binary signals 11 and 12. 11 is one whenever the loop data is +V and 0 otherwise, the 12 is one whenever the loop signal is −V and 0 otherwise. The input terminals of NOR gate 56 are connected to the lines carrying the 11 and 12 signals. The output of the NOR gate 56 is 0 whenever 11 or 12 is 1. This signal is passed into a low Q tuned filter 58 followed by a pulse forming circuit 60. The function of circuit 60 is to provide pulses in the middle of the +V or −V sections of the signal received from the loop.

Flip flop 62, coupled to circuit 60, divides the pulse stream into two pulse streams, i.e., the loop sample clock pulse on line 64 and the loop control clock pulse on line 66. The loop sample clock occurs in the first +V or −V occurrence in the transmitted signal and the loop control clock appears on the second +V or −V occurrence in the loop signal. Flip flop 68, connected to NOR gate 56, detects 0's in the 11 and 12 signal during the +V, −V occurrences in the loop signal. Two consecutive 0's are assumed to be the synchronization character and this indication is provided on line 70.

Figure 6:
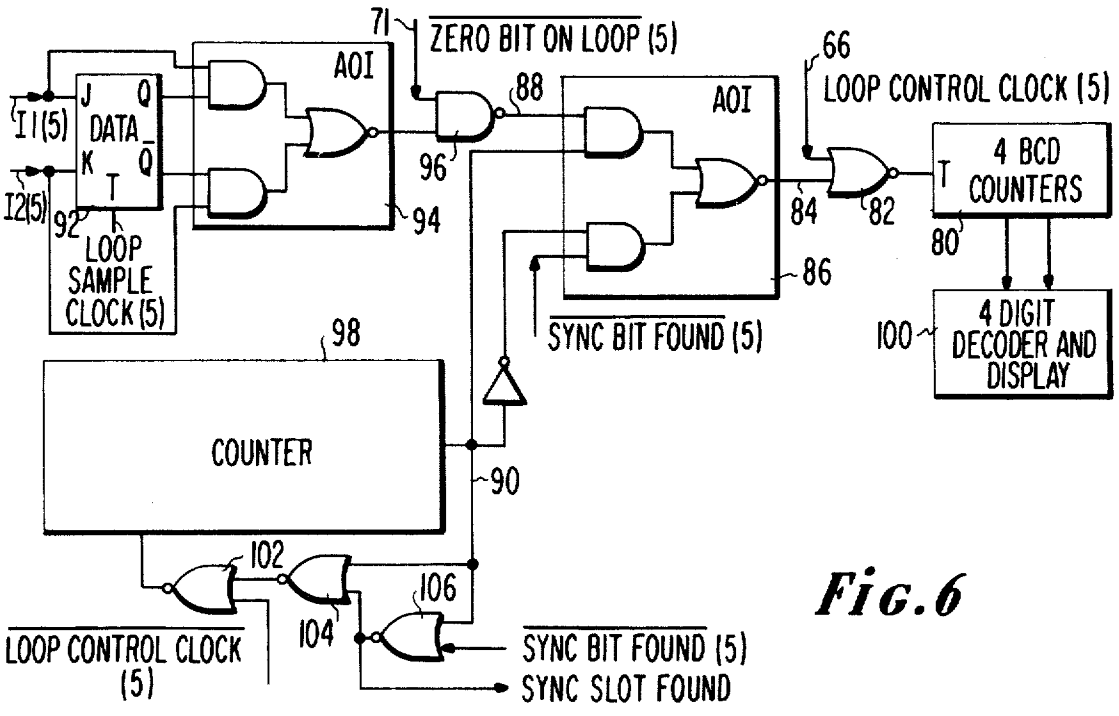

FIG. 6 shows the circuitry for detecting and counting violations in the transmission rule. In the modulation rule described with respect to FIG. 5 there are two elements transmitted on the loop for each logical bit. This transmission rule serves several purposes. It provides an average DC value on the loop of zero volts, guarantees frequent transitions, regardless of the logical bit stream, from which timing can be extracted, and provides sufficient redundancy to detect a large percentage of the errors that might occur on the loop. The purpose of the circuitry associated with FIG. 6 is to utilize the redundancy to detect violations in the transmission or modulation rule. By convention, the frame length in the present system is 80 logical bits. Every 20th bit is the synchronization character, and all other bits are logical ones or zeros and must follow the moulation rule. The control clock pulses on line 66 occur during the second of the two transmission elements corresponding to a particular logical bit. At control clock time, violations in the modulation rule are detected and registered in the four BCD counters 80 via the NOR gate 82. A violation in the modulation rule causes a low level on line 84 out of the and or invert gate 86. A violation occurs if the waveform encountered during counts 0 to 18 in counter 98 does not correspond to the waveform generated by a logical one or a logical zero. This is registered as a high level on line 88. A violation also occurs if the waveform encountered during count 19 does not correspond to the sync waveform. This is registered on line 90. The loop sample clock occurs during the first of the two transmission elements corresponding to a logical bit. At loop sample clock time the data register 92 is set if 11 is 1 and 12 is 0, reset if 11 is 0 and 12 is 1, and remains the same if both 11 and 12 are 0. Both 11 and 12 can never be 1 at the same time. At loop control clock time the output of the and or invert gate 94 is low if 11 is high during both of the transmission elements or 12 is high during both of the transmission elements. The lead 71 termed zero bit on loop comes from the NOR gate 73 in FIG. 5. This line is 0 at control clock time if either or both of the transmission elements corresponding to a logical bit on the loop is 0. The line 88 from gate 96 is high at control clock time if the two transmission elements on the loop are +V+V, −V−$V_2$, −V0, +V0, 0+V, 0−V, or 00. This corresponds to all possible violations in the modulation rule if a logical 0 or a logical 1 is transmitted.

Counter 98 counts the bits between sync slots. Counts 0 to 18 correspond to data bit positions and count 19 corresponds to the sync slot position. During counts 0 to 18 counter 98 is advanced by every loop control clock pulse. On count 19 the counter is advanced at loop control clock time only if the sync slot is found. If the sync slot is not found, counter 98 remains at count 19 until the next sync slot is found. If the sync bit is distorted, the counter will remain in this position for 20 bit times and count 20 errors. This provides a means, on the data display 100, for distinguishing between data errors and sync errors. A sync error increments the display 100 by 20, whereas a data error increments the display 100 by 1.

In addition, the circuitry of FIG. 6 provides means for initially synchronizing the counter 98 in FIG. 6 and the flip flop 62 from FIG. 5. Counter 98 remains in state 19 until two consecutive 0 transmission elements are found. This corresponds to sync. When sync is found, flip flop 62, in FIG. 5, is reset to obtain the proper positioning of the sample and control clock pulses. The counter 98 is also advanced so that it expects to see 19 data pulses before receiving the next sync pulse.

The pulse stream used to advance the counter 98, is obtained from NOR gate 102. Line 90 is high for counts 0 to 18 and low for count 19. When line 90 is high the output of the NOR gate 104 is low and the control clock pulses are filtered through the NOR gate 102, advancing the counter. When line 90 is low, the NOR gate 104 has a low output if and only if the NOR gate 106 is high. When the output of the NOR gate 104 is high, the output of NOR gate 102 is low, control clock pulses are blocked, and the counter is not advanced. When line 90 is low, the output of NOR gate 106 is high when the sync bit found signal on line 70 is low, indicating that the sync bit has been located. Therefore the counter 98 is advanced from count 19 to count 0 only after the sync bit is located.

Figure 7:
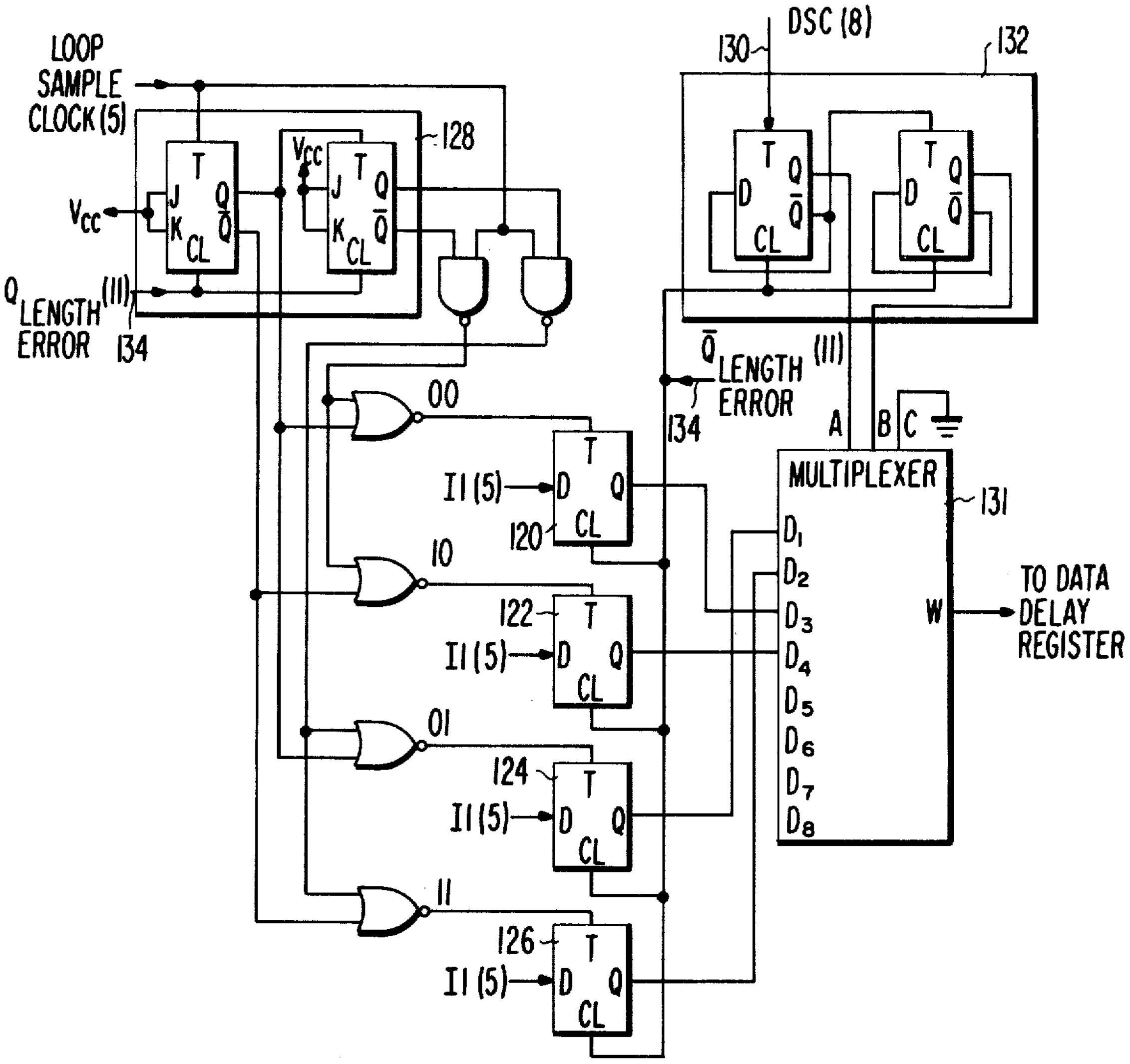

In FIG. 7 circuitry is shown for equalizing the phase between the receive and transmit signals. The loop controller 20 has a crystal oscillator (not shown) and generates timing for the loop. At each data processing unit, timing is derived by means of a low Q tuned filter and the signal is regenerated. Receive signal timing at the loop controller 20 is derived in a similar manner. The received signal clock derived at the input to the loop controller 20 differs in phase from the transmit signal clock and may jitter with respect to it. The purpose of the circuitry in FIG. 7 is to retime the received data using the transmit signal clock and absorb the jitter between the transmit and receive signal clocks. This is accomplished by sequentially loading one of the four flip flops 120, 122, 124 and 126 with the received data at the sample clock time derived from the received data stream. At this time, the counter 128 is also advanced so that at the next sample clock time the next flip flop in the sequence is loaded with the received data. The signal on line 130 is derived from the crystal oscillator and occurs at the same rate as the loop sample clock. This signal on line 130 increments the counter 132. The counter 132 controls the data selector or multiplexer 131 which determines which flip flop in the group 120, 122, 124 and 126 the next data bit will be read from. When the length of the delay line in the loop controller 20 is modified the two counters 128 and 132 are reset by the signal on line 134. After the two counters have been reset, the counter 128 causes the data to be loaded into the four flip flops in the order 120, 122, 124 and 126 and the counter 132 causes the data to be read from the flip flops in the order 124, 126, 120, 122. Therefore, there is a two bit time displacement between the time a flip flop is loaded and the time a flip flop is read out. This displacement is sufficient to absorb discrepancies in the phase between the signal on line 130 and the loop sample clock.

Figure 8:
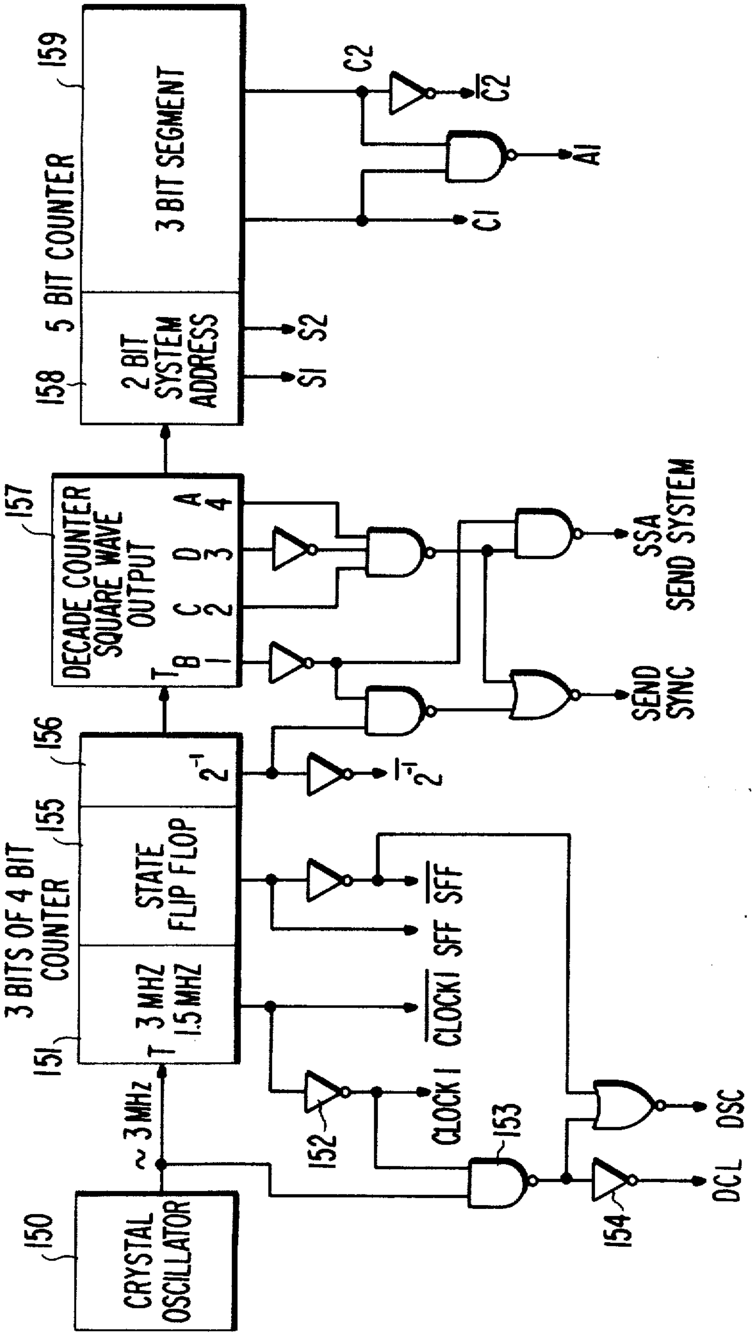

FIG. 8 shows how transmission timing, framing and synchronization is accomplished. The purpose of the circuitry in FIG. 8 is to count down from the crystal oscillator 150 and provide the timing necessary in transmitting signals. The crystal oscillator 150 generates a square wave at approximately 3 MHz. The first counter stage 151 divides the oscillator stream down to provide a square wave at approximately 1.5 MHz, the rate at which the transmission elements on the loop occur. Gates 152, 153 and 154 form the DCL pulses. These pulses occur at the same rate as clock 1, but are displaced in phase. They allow several sequential operations to be performed at the transmission element rate, without incurring race conditions. The counter stage 155 generates a square wave, SFF, at approximately 750 KHz, the rate at which logical bits are transmitted. It is low during the first transmission element of the bit, and high during the second, thus allowing the two transmission elements corresponding to the logical bit to be distinguished from one another. The pulse stream DSC occurs at the same rate as SFF, but is phase displaced to allow sequential operations to be performed at the logical bit rate without incurring race conditions. The pulse stream $2^{-1}$ is high and low during alternating logical bits. SFF drives the decade counter 157, and the combination of 156 and 157 count twenty logical bit times, the number of bits in a system address. One of the 20 bits is designated as send sync, and the two bits following it are designated as the send system address bits, SSA. The first and second system address bits are differentiated by the $2^{-1}$ pulse. The output of 157 drives a two stage counter 158, the outputs of which are the system address bits to be transmitted during SSA. The system address is incremented once every 20 logical bits. The output of 158 drives 159, a three stage counter. The last two stages of this counter are incremented once every 160 logical bits, the maximum time required for a bit to travel through the delay line 180 in FIG. 9. These two outputs are used to enumerate the four steps required to modify the length of delay line 180.

Figure 9:
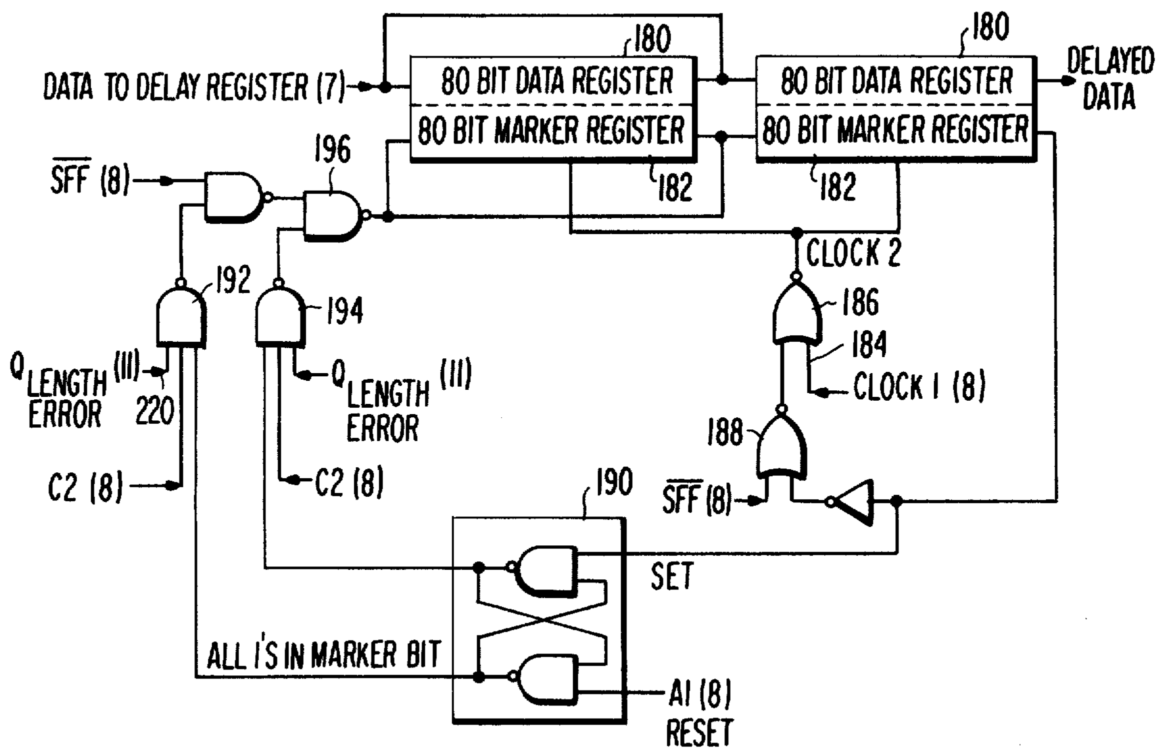
Figure 10:
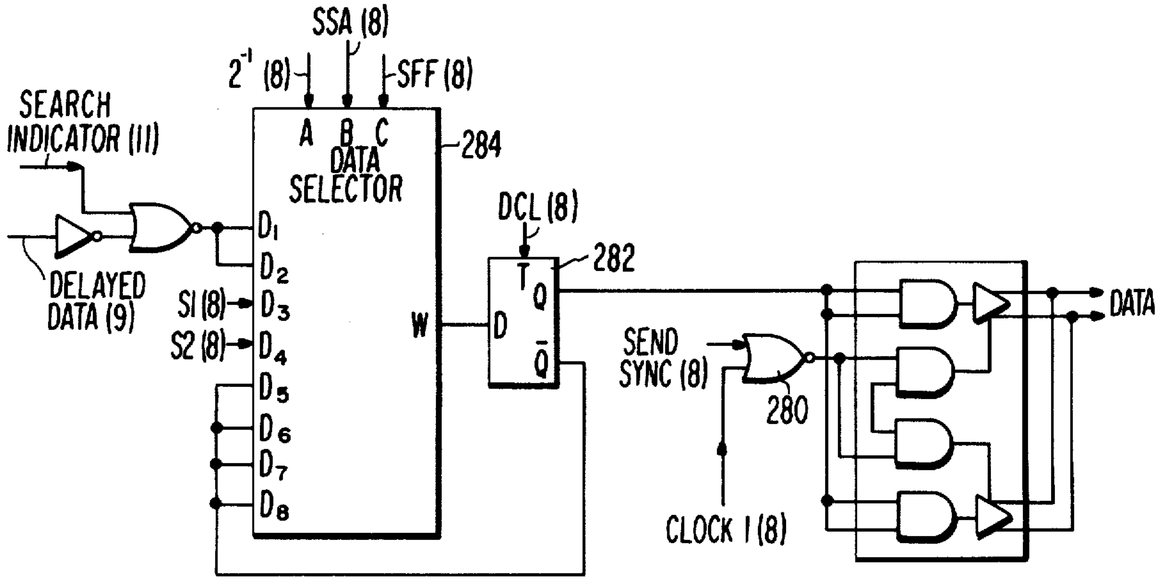

FIG. 9 shows the variable delay register located in the loop controller 20. The circuitry in FIG. 9 provides a delay between 80 and 160 bits in length depending on how many bits of delay are needed to make the total delay around the loop a multiple of 80 bits. The principal elements in this circuit are two 160 bit static shift registers 180 and 182, capable of being clocked at twice the frequency of the logical bits on the loop. Data is stored in one of the 160 bit delay registers, i.e., register 180 and a marker bit is stored in the other, i.e., register 182. Both delay registers 180 and 182 are clocked simultaneously. Clock 1 on line 184 is a 1 ½ MHz square wave. It may be thought of as being divided into two alternating sequences of pulses, each sequence occurring at a 750 KHz rate. The signal SFF is a 750 KHz square wave generated in FIG. 8. During normal operation (i.e., when the length of the delay line is not being modified) when SFF is low and a clock 1 pulse occurs data is shifted into the 160 bit data register 180 and a one is shifted into the marker register 182. After each data bit a spacer bit can be inserted into the static shift register 180. The spacer bit is indicated by a 0 in the marker register 182. If a 0 appears at the output of the marker register 182 when SFF is high, the registers 180 and 182 are shifted one bit at the next clock 1 time on line 184. At this time a 0 is reinserted into the input of the marker register 182 and the same data sense as had been inserted into the previous data bit is inserted into the data register 180. Data is shifted into the static shift register 180 at approximately 750 KHz. If there are no zeros in the marker register 182, a data bit takes 160 DSC clock times to get through the register. The effect of the spacer bit following a data bit is to reduce the number of DSC clock times necessary for a data bit to get through the register by one. Therefore, if there are no zeros in the marker register 182, a data bit takes 160 DSC clock times to get through the register, but if there is an alternating sequence of zeros and ones in the marker register, the data bit would only take 80 DSC clock times to get through the register. Any delay between 80 and 160 bits can also be obtained by eliminating zeros from the alternating sequence of zeros and ones in the marker register 182. The NOR gates 186 and 188 construct the clock 2 pulse string which shifts the registers 180 and 182. They allow every clock 1 pulse on line 184 to get through when the SFF signal is low, and when SFF is high the clock 1 pulse on line 184 gets through only if there is a zero in the output of the marker register 182.

Figure 11:
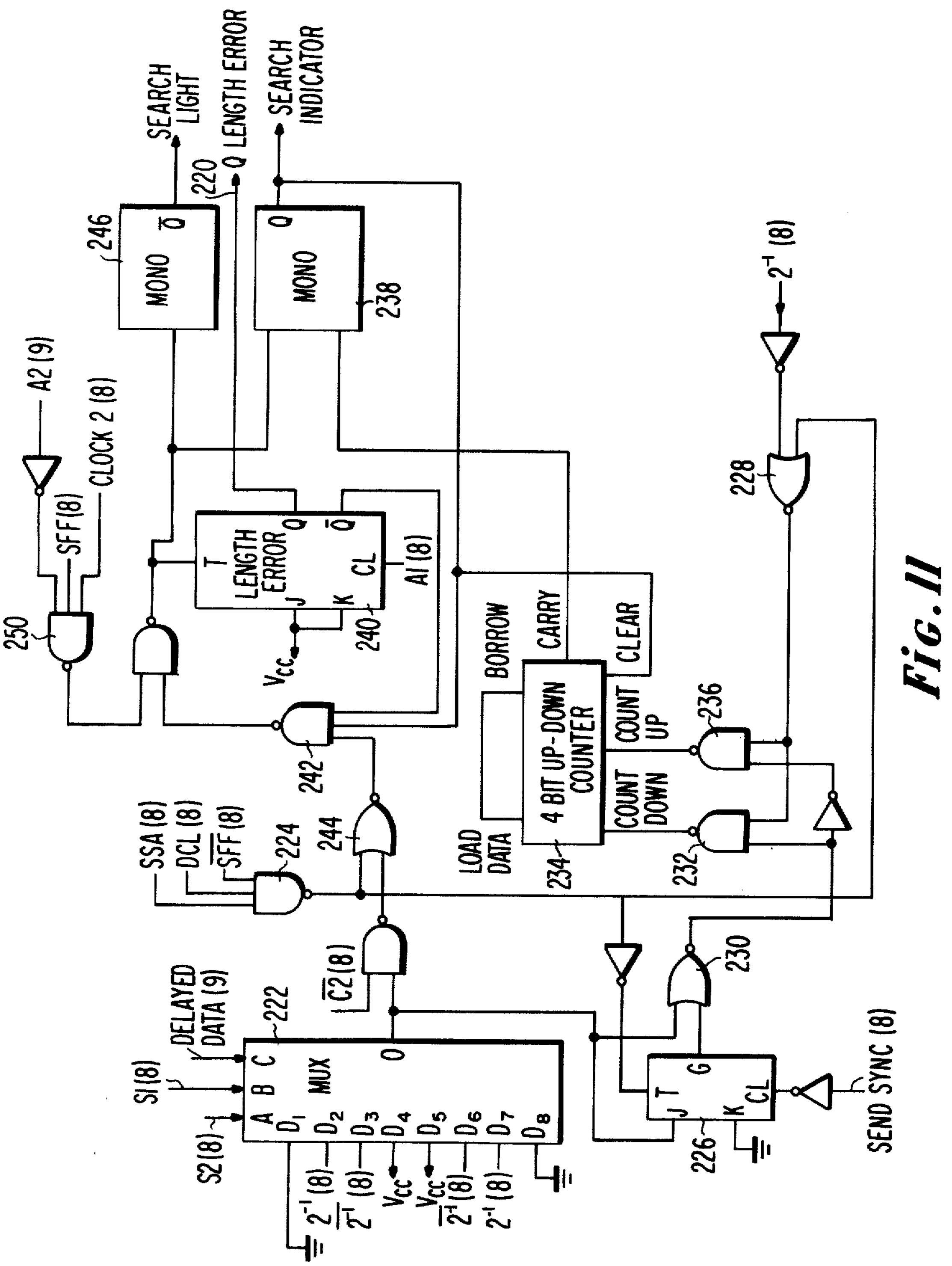

FIG. 11 is discussed at this point due to its close relationship to FIG. 9. In FIG. 11 circuitry is provided which decides when there is an error in the length of the delay line. This error condition is indicated in the circuit of FIG. 9 by a signal on the Q length error line 220. When a length error is indicated on line 220, the length of the delay line must be modified. If there are any zeros in the marker register 182, indicating a spacer bit, one of the zeros is eliminated and the delay line is lengthened by one bit. If there are no zeros in the marker register, the delay line is at its maximum length. To modify the delay line in this condition, a string of alternating zeros and ones is placed in the marker register 182 and the minimum length of the delay line is obtained. To perform the steps necessary to modify the delay line four states are defined. Each state lasts 160 DSC clock times. These states are enumerated as 0, 1, 2 and 3 by the waveforms C1 and C2 generated in FIG.

8. During state 3 indicated by A1 in FIG. 8 being low, flip flop 190 in FIG. 9 is reset. During states 0 and 1 if any zeros occur at the output of the marker register 182 flip flop 190 is set. If the flip flop 190 is still reset in state 2, it indicates that no zeros were in the marker register 182 and, therefore, the marker register 182 had all ones. State 2 is the state in which the marker register 182 is modified if a length error exists. If a length error is indicated and all ones are in the marker bit, then during state 2, the output of gate 192 is low and the output of gate 194 is high. Therefore, the output of gate 196 is low and zeros are shifted into the marker register 182. Zeros are shifted into the marker register 182 for the entire 160 bits of state 2. In state 3 the length error indicator 240 in FIG. 11 will be held reset, forcing the outputs of gates 192 and 194 to be high, the delayed data will be unintelligible and the output of the marker register 182 will contain all zeros. All zeros in the output of the marker register 182 will cause clock 2 to be exactly equal to clock 1 and the registers 180 and 182 will be shifted every possible clock 1 pulse time. During this state, the sense of SFF will be shifted into the marker register 182 causing a sequence of alternating ones and zeros to be shifted into the marker register and valid data will be shifted into the data delay register. At the end of state 3 the alternating sequence of ones and zeros in the marker register will force the delay line to assume its minimum delay.

It there is one or more zeros in the marker register 182 when a length error is indicated and state 2 occurs, the output of gate 194 will be low and the output of gate 196 will be high causing ones to be shifted into the marker register 182 each time a clock 2 pulse occurs. The first time a zero at the output of the marker register 182 is replaced by a one at the input of the marker register 182, the length error flip flop in FIG. 11 is reset. Therefore, one zero in the marker register will be replaced by a one. The data corresponding to this one will not be correct during state 2. However, during state 3, when this one reaches the output of the marker register 182, correct data will be inserted at the input. Removing the zero from the marker register causes the delay line to be increased by one bit.

FIG. 11 includes circuitry to frame comparison. The purpose of this circuitry in FIG. 11 is to determine when the length of the delay line is incorrect. This is done by examining the system address bits. The system address bits are the two bits following sync. They are 00, 01, 10, and 11 after the first, second, third and fourth sync bits in a frame. In the next frame the system address bits are repeated in the same sequence. After the system address bits are transmitted around the loop and through the delay line, if the total delay is a multiple of 80 bits, the system address bits about to be transmitted are identical to those being received. In the circuit of FIG. 11 a comparison is performed between the transmitted and received bits. If there is a significant difference between the transmitted and received bits, it is assumed that the length of the delay line is incorrect, and must be modified. The comparison between the delayed data and the present system address bits is performed by the chip 222 labeled MUX. The output of chip 222 is zero if the delayed data agrees with the system address bits and one if there is no agreement. Chip 222 is a standard multiplexer chip. The inputs D1 through D8 are chosen by addressing lines A, B and C with the two system address bits and the delayed data. For instance, if both system address bits are zero and the delayed data is also zero, the first input in the MUX chip 222 will be accessed. This input is zero indicating that the delayed data definitely agrees with the system address bit. The input to chip 222 marked $2^{-1}$ is zero when the first system address bit is to be transmitted and one when the second system address bit is to be transmitted. If S2 is one, S1 is zero and the delayed data is zero, the second input to multiplexer chip 222 is accessed. This is $2^{-1}$. If the delayed data is to be compared with the first system address bit (i.e., analyzing the first system address bit slot) $2^{-1}$ is zero indicating an agreement. If the delayed data, however, is to be compared to the second system address bit, $2^{-1}$ would be one indicating a disagreement. The output of the multiplexer chip 222 is examined by the two DCL output pulses occurring during not SFF when SSA (send system address) is high. This function is gated through gate 224. The flip flop 226 is cleared during send sync time which immediately preceeds the system address bits. If a disagreement occurs between the delayed data and S1 during the first DCL pulse filtered through gate 224, the flip flop 226 is set. The second pulse filtered through gate 224 is also filtered through gate 228. The second pulse occurs when $2^{-1}$ is high. When the second pulse occurs, if a disagreement exists between the delayed data and S2, the second system address bit, a 1 is present at the output of multiplexer 222. If a disagreement occurred between the delayed data and S1, the first system address bit, a one is present at the output of flip flop 226. If either of these leads are one the output of the NOR gate 230 is low. Therefore, gate 230 is low if there is a disagreement between the delayed data and either of the system address bits, and is high otherwise. If no disagreements occur between the delayed data and the system address bits, the second pulse being filtered through gate 228 is also filtered through gate 232 and the counter 234 is counted down. If any disagreements occur, the second pulse filtered through gate 228 is also filtered through gate 236 and the counter 234 is counted up. When the counter 234 is counted down through zero, it is reset to one. When it is counted up past 15 a pulse occurs in the carry input. This sets the monostable multivibrator 238, the time duration of multivibrator 238 is set to be greater than three frames. The first time multivibrator 238 is triggered the length error flip flop 240 is in the reset state and $\bar{Q}$ is high. Therefore, when the Q output of the monostable 238 goes high, the up down counter 234 is cleared and the gate 242 is enabled and will pass pulses from gate 244. If a disagreement occurs between the delayed data and the appropriate S1 or S2 when $\overline{C2}$ is high, the pulse from gate 224 filters through NOR gate 244. $\overline{C2}$ being high indicates state zero or state one, these two states occur when the delay line is not being modified and any error introduced into the delay line by a previous modification has been removed. The pulse that filters through gate 242 sets the length error flip flop 240 and indicates that the length of the delay line must be modified. When the length error flip flop 240 is set, the monostables 238 and 246 are also triggered. Monostable 246 lights a panel indicator, called the search light, to indicate that the unit is modifying the length of the delay line.

The length error flip-flop 240 is reset as soon as the length of the delay line is modified (either made one bit longer or reduced to its minimum length), while the monostable 238 remains set for at least three frames after it is set. As long as the monostable 238 is set, a single error in the system address bit positions causes the length error flip flop 240 to be set and the length to be modified. This speeds up the search for a new length. If monostable 238 is set, it indicates that a significant number of errors have been found in the system and a new delay line length is being searched for. After the length is modified there is no assurance that it is the proper length, so instead of waiting for a significant number of errors to occur before modifying the length again, the length is modified after the first error in system address is found. Only after all system address bits in the frame are correctly received does the system return to its normal state and require a significant number of errors before modifying the length again.

When the length of the delay line is modified, the length error flip flop 240 is reset. Flip flop 240 is reset by a low level on the clear input during state 3, or a pulse through gate 250 when it is in the set state. The flip flop 240 is set during states 0 to 1 if a new length is desired. If, during state 2, flip flop 240 is set, a zero occurs at the output of the marker register 182, and a one is inserted at the input, a pulse is filtered through gate 250 that resets the flip flop 240. This pulse indicates that the delay line was made one bit longer. If this pulse does not occur during state 2, it indicates that the marker register 182 contained all 1's (i.e., it was at its maximum length). The circuitry, associated with the delay line, inserts all zeros in the marker register to force it to its minimum length. The length error flip flop 240 is then reset when state 3 occurs.

FIG. 10 shows the circuitry for providing the transmit multiplexing and modulating function. The purpose of the circuitry of FIG. 10 is to modulate the logical data to be transmitted out of the loop controller 20 according to the modulation rules. The gate 280 guarantees that the signal on the loop will be zero during send sync time and when clock 1 is high. When clock 1 is low, and sync is not being sent, the level on the loop will be +V if the output of flip flop 282 is 1 and −V if the output of flip flop 282 is 0. The output of flip flop 282 is changed on the rising edge of the DCL clock, which occurs when clock 1 is high and the data level on the loop is zero. When SFF is low a logical bit is loaded into flip flop 282 and when SFF is high the inverse of that logical level is loaded into flip flop 282, thus generating the modulation rule used on the loop. When SFF is low, one of the first four inputs in the data selector 284 is chosen. If SSA (the send system address bits) is low, one of the first two inputs to the data selector is chosen. Both of these inputs are identical. If the length of the delay line is correct, these two inputs are the delayed data. If the length of the delay line is incorrect, these two inputs are zero. When SSA is high, the imputs D3 and D4 to data selector 284 are selected. D3 is chosen first, this is the first system address bit, and D4 is chosen second, the second system address bit. This guarantees that the correct system address bits are transmitted in the correct position in the frame.

Figure 12A:
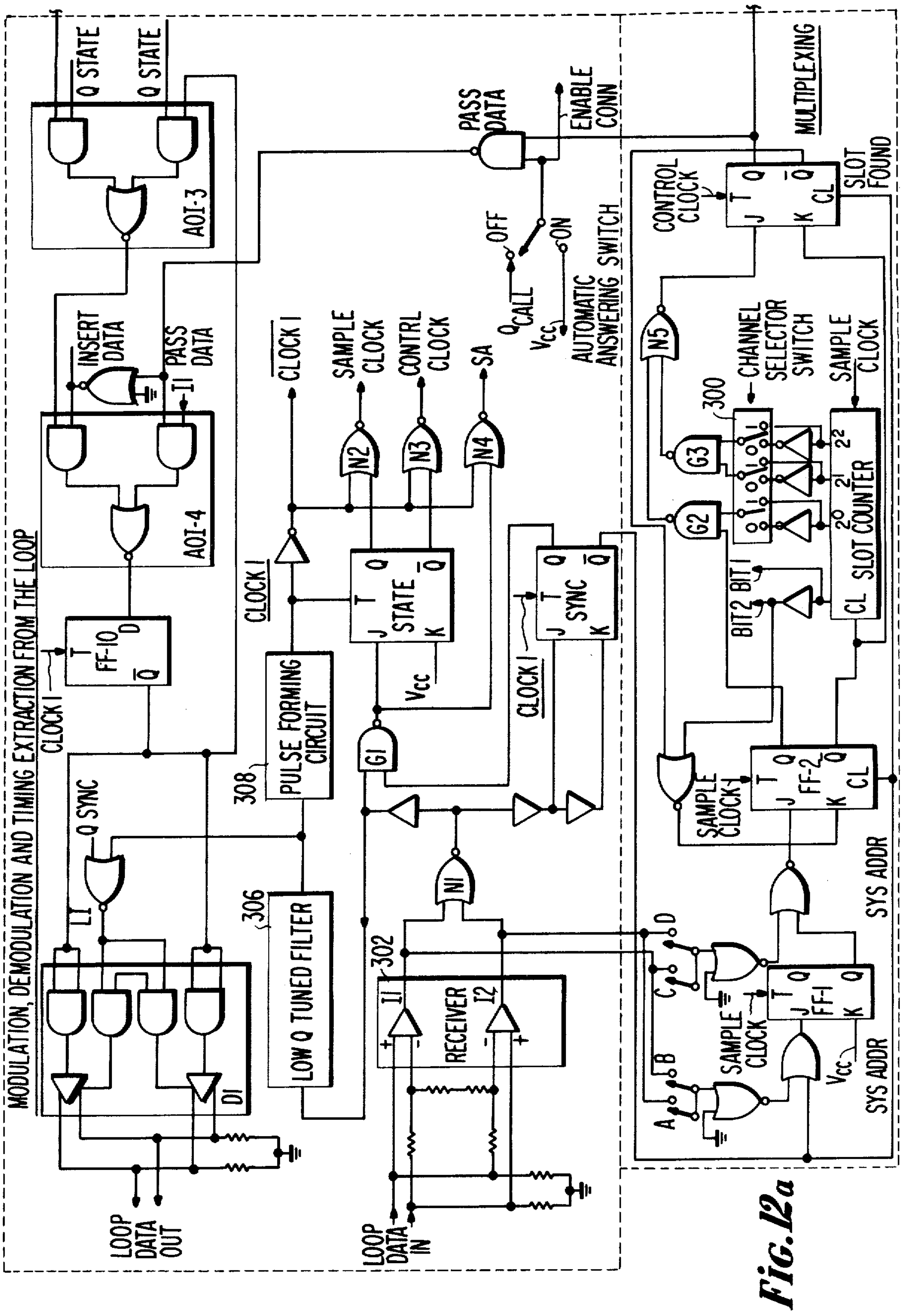
FIG. 12A and FIG. 12B is a diagram showing the details of the data processing units used in the system of FIG. 1.
Figure 12B:
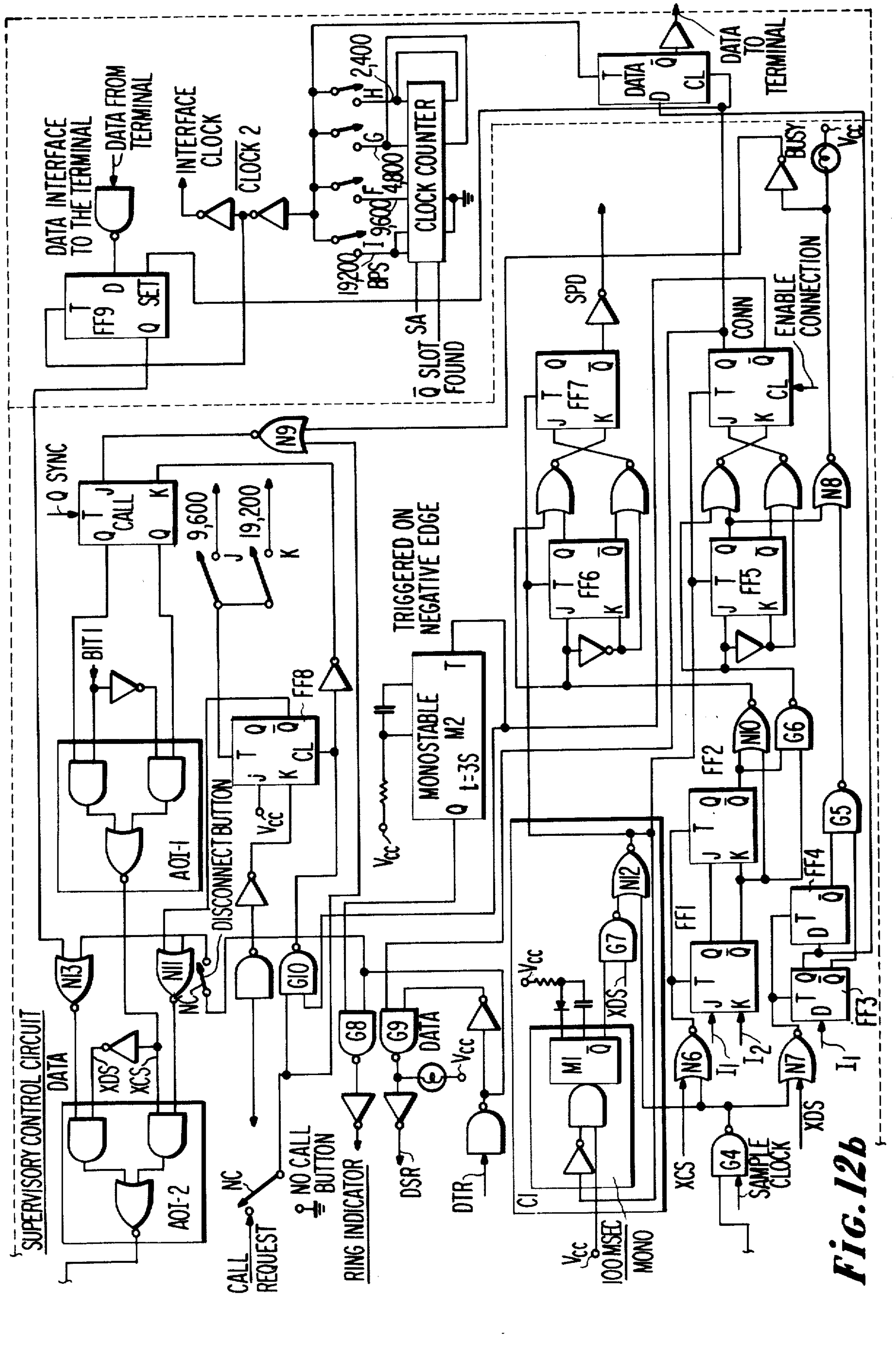

In FIG. 12A and FIG. 12B the details of the structure comprising the data processing units are shown. The unit establishes a connection in a particular slot on the time division multiplexed loop. Once a connection is established the function of the unit is to remove data from and insert data into that particular channel being used. The data inserted on and removed from the loop is passed to a terminal device over a connector conforming to the RS232 interface specification. The terminal connected to the interface connector can be any asynchronous terminal operating at rates up to 9,600 bits per second or any synchronous terminal operating at rates of 2,400, 4,800 or 9,600 bits per second.

The data processing unit also provides a switching capability. A unit may or may not be in the answer mode although, at least one unit must be in the answer mode on a particular channel, before a connection can be established on that channel. A unit wishing to establish a connection (the originating unit), which is not in the answer mode, turns a channel selector switch to the appropriate channel. If that channel is being used, a busy indicator lights, and the unit is inhibited from making a connection on that channel. If the busy indicator does not light, the connection is established by pressing a DATA ON button on the front panel of the unit, or putting a low signal level on a call request lead. The terminal in the answering mode (answering unit) on this channel will be informed of the originating units request to establish a connection by a signal appearing on a ring indicator lead of the RS232 interface connector. If the answering unit returns a high level on the data terminal ready lead, the originating unit is informed that the answering unit is ready to receive data by a high level on the data set ready lead of the RS232 interface connector. This completes the connection. Either terminal can break the connection by bringing the data terminal ready lead on the RS232 interface connector low, or by pressing the DATA OFF button on the front panel of the data processing unit.

The present loop system has 80 bit frames. The frames occur 9,600 times per second, and each frame is divided into four 20 bit subframes. The first bit in each subframe is a sync bit, and the second and third bits are system address bits. Each of the four subframes has a different system address. A single channel in the loop system consists of two time slsots. Following the system address there are 8 two-bit channels, and the 20th bit in each frame is unused but is available for parity or system status information. Each channel has a control and a data bit. The originating terminal inserts control information in the first bit and data in the second bit. The answering terminal inserts data in the first bit and control information in the second bit. Each terminal assigned one data slot per frame has 9,600 data bits per second, to obtain a rate of 19,200 data bits per second a terminal is assigned two evenly spaced slots.

The sync bits appearing on the loop are counted down to provide the synchronous terminal with timing, and a synchronous terminal may use every data bit assigned to it. The data bits sample the data signal from an asynchronous terminal, and, to guarantee an accurate reconstruction at the receiver, at least four samples are taken for each data bit transmitted. Therefore, if 9,600 data bits per second are assigned to an asynchronous terminal, the terminal should have a rate of 2,400 bits per second or less.

By convention, when a terminal is not transmitting data, it transmits a marking line in the data slot. The marking line is transmitted as a zero on the loop, the reason for this should be clear shortly. The control bit has two functions. It indicates that the device with which one is communicating is still connected to the loop and ready to receive, and it provides a low speed data channel for transmitting supervisory data. When a channel is not being used, the connect bit is zero all of the time, when a connection is established and the supervisory data lead is zero, the connect bit is one all of the time, and when the connection is established and the supervisory data lead is one, the connect bit is an alternating sequence of ones and zeros. All zeros in the control slot indicates that the connection has been broken. If a data processing unit inadvertently leaves the loop, without transmitting zeros in the control slot, the data slot being transmitted by the unit remaining on the loop circulates around the loop and returns in the position this remaining unit expects to see control information. Since this data processing unit transmits a marking line, which is transmitted as zeros on the loop, when data is not being transmitted, all zeros are eventually received in this position. Thus, by transmitting a marking line as zero, an indication is provided when the unit being communication with has terminated the connection.

The diagram for the data processing unit shown in FIG. 12A and FIG. 12B is divided into four main sections. Section 1, labeled modulation, demodulation and timing extraction from the loop, interfaces the data processing unit logic with the twisted pair loop. Its function is to demodulate the signals from the loop, extract timing, and modulate the signal for transmission to the next unit. The second section, labeled multiplexing, determines the slot assigned to a particular unit. The slot is determined by the system address switches, which are set internally, and the channel selector switch 300 on the front panel of the unit. Section 3, supervisory control functions, determines when a channel is busy, if a connection is to be established, and determines when an established connection has been broken. In this section the data and control information from the data terminal is inserted into the proper positions in the slots. Signals are provided to the terminal to indicate that a connection has been established or that a connection is to be established, and signals are received from the terminal indicating that the terminal is willing to establish a connection. The fourth and final section is the data interface to the terminal. Its function is to provide timing for synchronous devices, and translate between the RS232 levels used by the terminal and the logic levels used by the data processing unit.

The signal from the loop is translated by the receiver chip 302 into two binary data streams 11 and 12. The stream 11 is one if the loop signal is +V and O otherwise, and the signal 12 is one if the loop signal is −V and O otherwise. Individually, these two signals indicate when either +V or −V is present on the loop, to determine when zero is present on the loop these signals are combined in the NOR gate N1. The output of this gate is 1 only if zero is present on the loop. Due to the waveform transmitted on the loop, the output of NOR gate N1 is a square wave during 19 of the 20 logic bits transmitted on the loop, i.e., during all bits except the sync bit. This partial square wave is passed through a low-Q tuned filter 306 and a pulse forming circuit 308 to provide the signal clock 1. Clock 1 is a string of narrow pulses occurring during the +V or −V section of the loop signal and during the zero portions of the sync signal corresponding to the +V or −V section of the signal. This section of the signal will be referred to as the transmission element. If a one is encountered at the output of the NOR gate N1 at clock 1 time, indicating a zero transmission element, the sync flip flop is set. If a one is encountered at the output of the NOR gate N1 when the sync flip flop is set, the output of the gate G1 is low. There are two clock 1 pulses for each logical bit transmitted on the loop. Each clock 1 pulse occurs during a different transmission element. If the output of the gate G1 is low, when a clock 1 pulse occurs, this clock 1 pulse is assumed to be occurring during the second transmission element of the sync bit. On the trailing edge of this clock 1 pulse the state flip flop is put into the reset state. This pulse is also filtered through NOR gate N4 and produces the signal SA, which increments the clock counter. This signal occurs 38,400 times per second if no errors occur on the loop, and is counted down to provide timing for synchronous devices. The next clock 1 pulse which occurs during the first transmission element of a non-sync bit is filtered through the NOR gate N2. Since the bit is a non-sync bit, the output of G1 is high and the state flip flop is toggled on the trailing edge of this clock pulse. The clock pulse following this is filtered through the NOR gate N3. Once again, G1 is high and the state flip flop is toggled. In this manner alternating clock 1 pulses are filtered through the NOR gate N2 and NOR gate N3. The clock pulses filtered through the NOR gate N2 occur during the first transmission element of the two transmission elements corresponding to a logical bit, and are called the sample clock pulses. The clock pulses through the NOR gate N3 occur during the second transmission element of the two transmission elements corresponding to a logical bit, and are called the control clock pulses.

The received data on leads 11 and 12 are brought into the multiplexer section through switches AB and CD. The purpose of the circuitry immediately following these switches is to recognize a preset system address. The switch pairs AB and CD may have either one or neither of the two switches closed, but both switches must not be closed at the same time. The switch pair AB selects the first bit of system address. If A is closed and B is open, the first selected system address bit is 1. If A is open and B is closed, the first selected system address bit is zero. If both A and B are open, the first bit of system address doesn't matter and system address one being 1 or 0 is selected. Similarly, the switch pair CD selects the second bit of system address. Switch C closed and switch D open selects 1, switch C open and switch D closed selects 0, and both being open means the second address doesn't matter. The doesn't matter positions allow a terminal to be assigned several bits within the same frame. For instance, if one of the switch positions is in the doesn't matter position, the terminal will be assigned two data slot positions in the frame and obtain 19,200 data bits per second, and if both switches are in the doesn't matter position, the terminal will be assigned four data slots in the frame or 38,400 bits per second.

In the transmission frame two system address bits immediately follow each sync bit. During the first sample clock pulse following sync, the $\overline{Q}$ output of the sync flip flop will be low, if the output of the switch pair AB is high, indicating an agreement with the preselected first system address bit, the flip flop system address 1 will be toggled into the set position on the trailing edge of the sample clock pulse. On the trailing edge of the second sample clock pulse following sync, the flip flop system address 1 will be set if the flip flop system address 1 is set and a 1 is present at the output of switch pair CD, indicating an agreement with the second bit of system address selected. At the trailing edge of this sample clock pulse the system address flip flop, system address 1, will be reset since the $\overline{Q}$ output of the sync flip flop is now high, and the J input of the system address 1 flip flop is low. The channel selector switch 300 on the front panel indicates which of the 8 channels, or slots, the data processing unit is presently accessing. The slot counter is held to 0 until the system address 2 flip flop is set. At this time, the appropriate system address has been located. The slot counter is then incremented each time a sample clock pulse occurs. The slot found flip flop is set on the trailing edge on the control clock pulse preceding the slot selected. The second sample clock pulse of the pair corresponding to the slot selected resets the system address 2 flip flop. This causes the control clock pulse following this to reset the slot found flip flop. Therefore, the slot found flip flop is set during the two sample clock pulses corresponding to the slot selected. The two sample clock pulses occurring during the slot assigned to a terminal are filtered through gate G4. XCS, transmit control slot, is high during the transmit control slot time and therefore low during the receive control slot time. XDS, the transmit data slot, is high during the transmit data slot time and therefore low during the receive data slot time. The sample clock pulse occurring during receive control slot time is filtered through the NOR gate N6 and the sample clock pulse occurring during receive data slot time is filtered through the NOR gate N7. The data on the loop, appearing on leads 11 and 12 during the receive control slot time, is loaded into flip flop FF1, the data from the previous control slot time is loaded into flip flop FF2. Similarly, during the received data slot time the data on the loop is loaded into flip flop FF3 and the data from the previous data slot time is loaded into flip flop FF4. Flip flop FF4 is not needed to receive data, but will be needed to determine if the channel is busy. When the channel is busy, the control slot has either 1 or an alternating sequence of 1's and 0's. When a third data processing unit interrogates a channel presently being used by two other units, the third unit does not known which position the control bit is in. It will either be in the first or second position, depending on whether this unit follows the answering or the initiating terminal on the loop. If the channel is busy, one of the slots will be the control slot and will contain either all one's or an alternating sequence of 1's and 0's. Therefore, to determine if the channel is busy, the unit must interrogate both bit positions in the channel and determine if either all 1's or an alternating sequence of 1's and 0's exists. If the slot this unit considers is the received control slot and it contains a connect sequence, the gate G6 will be high and the flip flop FFS will be high. If the slot this unit considers is the received data slot and its contains the control sequence, the gate G5 will be high. If either of these outputs from G5 or G6 are high, the output of NOR gate N8 will be low and the busy indicator light will be lit. In addition, the output of the NOR gate N9 will be low and any attempt to initiate a call will be blocked. The complete mechanism for initiating and terminating calls will be discussed after the normal operation of the terminal during a call or during the absence of a call is described.

The circuit C1 comprising a monostable multivibrator M1 and the gates G7 and N12 filters one receive control clock pulse through the gate N12 every 100 milliseconds. This pulse, from gate N12, loads the present state of the connect bit, as indicated by gate G6, into the flip flop FF5. The connect flip flop is also loaded at this time providing the present state of the connect bit agrees with the state of the connect bit loaded into flip flop FF5 100 milliseconds ago. This agreement requirement prevents the connect status of the data processing unit from being changed by most noise bursts on the loop. When the connect flip flop is set, an indicator that the data set is ready to transmit is provided to the data terminal on the RS232 interface connector through gate G9 provided, however, that the terminal indicates it is ready on the DTR lead of the interface connector. When the connect bit is low, the data to the terminal of the data flip flop is held clear to provide a marking line level at the interface connector and data from the terminal at flip flop FF9 is held set. This will provide a 0 on the loop during the data slot for the answering terminal. The need for this 0 will be apparent shortly. When the connect bit is initially set, the monostable M2 is triggered and provides a 3 second pulse. This pulse activates the ring indicator on the interface connector if the data terminal is not ready. If the terminal is capable of receiving a call, it will respond to the ring indicator by bringing data terminal ready high. An alternating sequence in the connect bit produces a low level of the output of gate N10 whereas an all 1 sequence in the connect bit produces a high level at the output of gate N10. This level is loaded into flip flops FF6 and FF7 using the same pulses that were used to load the connect flip flop. The level is reproduced on the SRD (supervisory received data) lead to the RS232 interface connector. The sample clock pulse occurring during the receive data slot loads the data into flip flop FF3 and a clock at the rate selected by the clock counter loads that data into the data register, and appears on the data to terminal lead of the interface connector. For an asynchronous terminal, the clock chosen should be equal to the number of slots per second, for a synchronous terminal the clock chosen can be any available clock less than or equal to the number of slots per second. The data from the terminal on the RS232 interface connector is loaded into flip flop FF9 using the same clock rate that was used for the data flip flop.

A data processing unit that places a call will have the call flip flop set during the entire call time. A unit that answers a call will have the call flip flop reset during the entire call time. Bit 1 is 0 during the first sample clock in the slot and 1 during the second clock in the slot. Therefore, if the call flip-flop is set, the output of the and or invert gate AOI-1 is high during the first bit and low during the second bit. However, if the call flip flop is reset, the output of the and or invert gate AOI-1 is low during the first bit and high during the second. The bit position during which AOI-1 is high is designated as the transmit control slot and the bit position during which AOI-1 is low is designated as the transmit data slot. The originating terminal uses the first slot to transmit control information and the second slot to transmit data information. The answering terminal uses the first slot to transmit data information and the second slot to transmit control information. The output of the AND gate G10 is high if the call button is pressed or if the connection is being maintained. If the output of G10 is low, the flip flop FF8 is held reset. If the flip flop FF8 is not being reset and the lead STD from the RS232 interface connector (transmit supervisory data) is low, flip flop FF8 is always high. If the STD lead is high the flip flop FF8 oscillates between the high and low state at the slot rate on the loop. The control bit is the output of the NOR gate N11, it is a combination of the state of the flip flop FF8, the disconnect button and data terminal ready. If the disconnect button is pressed or data terminal ready is low, the control bit is 0, if not, it is equal to the state of the flip flop FF8. Similarly, the data bit is the output of N13 and is zero if the disconnect button is pressed or data terminal ready is low, and is otherwise equal to the sense of the transmitted data. The output of the and or invert gate AOI-2 inserts the data and control information in the proper sequence. If the state flip flop is low, indicating a sample clock time, the data from the and or invert gate AOI-2 is passed through the and or invert gate AOI-3. If this is also the slot assigned to the terminal, the data is passed through the and or invert gate AOI-4 and inserted in the flip flop FF10. When the output of the state flip flop is high, the data passed through the and or invert gate AOI-3 is the inverse of the data in the flip flop FF10. This forces the data generated by the unit to obey the modulation rule on the loop. The insert data lead in the and or invert gate AOI-1 is high if the slot has been found and the unit is in the automatic answering mode or if the slot has been found and the unit has set the call flip flop. This means that a data processing unit in the automatic answering mode can insert data on the loop whether or not a connection is made. When a connection is not made, the data input from the answering unit has been set to 0 and the control bit is 0. Therefore, the data processing unit in the answering mode will zero the slot when it is not being used. The unit that is not in the answering mode can only insert data in the slot after it has successfully set the call flip flop. Successfully setting the call flip flop requires that the channel not be used. Therefore, the unit not in the answering mode cannot interrupt the conversation or insert data over a conversation between two other units. When a data processing unit is not inserting data, it is passing data. The data it passes is 11 which is the data received from the loop. The chip D1 is a drive chip, which converts the binary logic levels used in the unit to the ternary modulation levels used on the loop. When Q sync is high, or the output of the low-Q tuned filter 306 is high, the level on the loop is held to zero by the lead L1. When neither of these levels are high, +V or −V is inserted on the loop depending on the state of the flip flop FF10.

To establish a connection a calling data processing unit operator searches for a non-busy channel. Having found a non-busy channel, the operator brings the data terminal ready lead from the terminal device high, then inserts a high level on the call request lead or presses the DATA ON button, thus causing a 1 to be sent out in the connect bit position. The unit in the answer mode, seeing a 1 in a connect bit position, gives a ring indicator to the terminal over the RS232 interface connector if the data terminal ready lead from the terminal is low. When the data terminal ready lead is brought high, a 1 is transmitted in the connect bit position and the data set ready lead is brought high. The originating unit sees the 1 in the connect bit position from the answering terminal, completing the connection, and the data set ready lead of the originating terminal is brought high. In this manner, the connection is established. Either termnal can break the connection by bringing its data terminal ready lead low or pressing the disconnect button. When either of these operations are performed, zeros are inserted in both the data and control bit positions. The unit that performs this operation is referred to as the disconnecting terminal. These zeros travel around the loop to the terminal with which the disconnecting terminal is communicating, i.e., the disconnected terminal. The connect flip flop at the disconnected terminal is reset. If the disconnected terminal is in the auto-answer mode, it inserts zeros in both bit positions after it is disconnected. If the disconnected terminal is not in the auto-answer mode, it stops modifying the data from the disconnecting terminal. In either case, zeros are returned to the disconnecting terminal in both bit positions. These zeros reset the connect flip flop at the disconnecting terminal. If the disconnecting terminal is in auto-answer mode, it continues to insert zeros in both bit positions. If it is not in auto-answer mode, it stops modifying the data in the slot and the disconnected terminal, which must be in the auto-answer mode, continues to send zeros in both bit positions. Thus, the channel is no longer busy and the connection is broken.

What is claimed is:

1. A given data processor for a time division multiplexed communications system, wherein a plurality of data processors are connected in series in a loop configuration, each of said data processors being associated with a data terminal, each of said data processors further having a calling and a called mode of operation for transmitting and receiving digital information signals to and from said loop in a selected time division multiplexed channel within a frame of channels, said frame comprising a plurality of sub-frames, each subframe being preceded by a digital address signal, each channel comprising at least a first and a second time slot, said given data processor comprising:

first means adapted to receive said digital information signals from said loop;

channel identification means connected to said first means and responsive to said digital address signals for locating said first and second time slots of said selected time division multiplexed channel;

second means for inserting digital data signals onto said loop from the associated data terminal in said second time slot of said selected channel when said given data processor is in said calling mode of operation and for inserting digital data signals onto said loop from said associated data terminal in said first time slot of said selected channel when said given data processor is in said called mode of operation;

third means for inserting a digital connection signal, indicative of the status of a connection between said given data processor and another data processor on said loop, in said first time slot of said selected channel when said given data processor is in said calling mode of operation and for inserting said digital connection signal in said second time slot of said selected channel when said given data processor is in said called mode of operation; and busy indication means coupled to said channel identification means for analyzing said first and second time slots of said selected channel and for detecting the presence of said digital connection signal from another data processor, said busy indication means preventing access to said selected channel by said given data processor when a digital connection signal is detected in said first or said second time slot.

2. The given data processor according to claim 1 further comprising modulation means for translating digital signals provided by said associated data terminal from a first format to a second format, said second format having a first sequence of voltage levels to represent a logical one and a second sequence of voltage levels to represent a logical zero, said first and second sequences having an average D. C. level of zero volts.

3. The given data processor according to claim 2 further comprising demodulation means for translating digital information signals received from said loop in said second format to said first format, said first format having one voltage level representing a logical one and another voltage level representing a logical zero.

4. The data processor according to claim 3 wherein said channel identification means comprises a slot counter responsive to said digital address signals for counting down said time division multiplexed time slots to said selected channel first and second time slots.

5. The given data processor according to claim 4 further comprising:

timing extraction means coupled to said first means for deriving at least one clock signal from said received digital information signals;

clock counter means responsive to said at least one clock signal for providing a plurality of timing information signals; and means for coupling a selected one of said plurality of timing information signals to the data terminal associated with said given data processor.

6. The given data processor according to claim 5 wherein said data terminal associated with said given data processor is an asynchronous data terminal and wherein means are provided foor sampling the digital signals provided to and from said asynchronous data terminal at a rate determined by one of said plurality of timing information signals provided by said clock counter means.

* * * * *